(12) United States Patent
Cunha

(10) Patent No.: US 9,548,010 B2
(45) Date of Patent: Jan. 17, 2017

(54) COLLAPSIBLE SIGN POST

(71) Applicant: Fabio Eduardo Sabonge Cunha, São Paulo (BR)

(72) Inventor: Fabio Eduardo Sabonge Cunha, São Paulo (BR)

(*) Notice: Subject to any disclaimer, the term of this patent is extended or adjusted under 35 U.S.C. 154(b) by 0 days.

(21) Appl. No.: 14/806,187

(22) Filed: Jul. 22, 2015

(65) Prior Publication Data
US 2016/0027351 A1 Jan. 28, 2016

(51) Int. Cl.
*G09F 15/00* (2006.01)
*F16L 3/26* (2006.01)
*F16M 11/22* (2006.01)

(52) U.S. Cl.
CPC ........... *G09F 15/0075* (2013.01); *E01F 9/615* (2016.02); *E01F 9/635* (2016.02); *F16L 3/26* (2013.01); *F16M 11/22* (2013.01)

(58) Field of Classification Search
CPC ............. G09F 15/0062; G09F 15/0025; G09F 15/0068; G09F 17/00; G09F 7/18; G09F 1/06; G09F 15/00; G09F 21/04; G09F 15/0056; G09F 7/00; G09F 1/065; G09F 2013/0472; G09F 7/22; G09F 15/0012; E01F 13/02; E01F 9/0122; E01F 9/012; E01F 13/022; E01F 13/028; E01F 9/0175; E01F 9/658; E01F 13/085; E01F 9/014; E01F 9/016; E01F 13/06; E01F 13/12; E01F 15/086; E01F 7/00; E01F 7/04
USPC ............................. 248/156, 507, 508; 40/610
See application file for complete search history.

(56) References Cited

U.S. PATENT DOCUMENTS

| | | | |
|---|---|---|---|
| 4,150,790 A | | 4/1979 | Potter |
| 4,432,172 A | * | 2/1984 | Kuykendall ............ E04H 12/04 144/330 |
| 4,441,679 A | * | 4/1984 | Calet ..................... E04H 12/223 248/156 |
| 4,995,590 A | * | 2/1991 | Close .................. E04H 17/1434 256/23 |
| 5,205,236 A | * | 4/1993 | Hughes ................. E01F 9/0175 116/209 |
| 5,658,519 A | | 8/1997 | March et al. |
| 5,903,991 A | * | 5/1999 | Sasse ........................ G09F 7/22 248/156 |

(Continued)

FOREIGN PATENT DOCUMENTS

| | | |
|---|---|---|
| BR | PI0505428 | 9/2007 |
| BR | PI0704541 | 1/2009 |
| BR | PI0900485 | 6/2012 |

*Primary Examiner* — Steven Marsh
(74) *Attorney, Agent, or Firm* — Russell T. Manning; Marsh Fischmann & Breyfogle LLP

(57) ABSTRACT

Disclosed is a support post for supporting roadway signs. In one embodiment, a polymer support post is formed of a composition of high density polyethylene—HDPE—, ground rubber and 'XLPE'/Polycure. All these materials may be sourced from recycled materials. Additionally, the support may include ultra-violet materials and flame retardant materials. In one embodiment, the ultra-violet materials and flame retardant material are included in recycled XLPE material. One or more support rods may be disposed within the polymer support post. Additionally, one or more fragility apertures may extend through the support post to allow the support post to collapse upon impact.

16 Claims, 7 Drawing Sheets

(56) References Cited

U.S. PATENT DOCUMENTS 6,284,336 B1 * 9/2001 Greene .................... E04C 3/34
  106/772

* cited by examiner

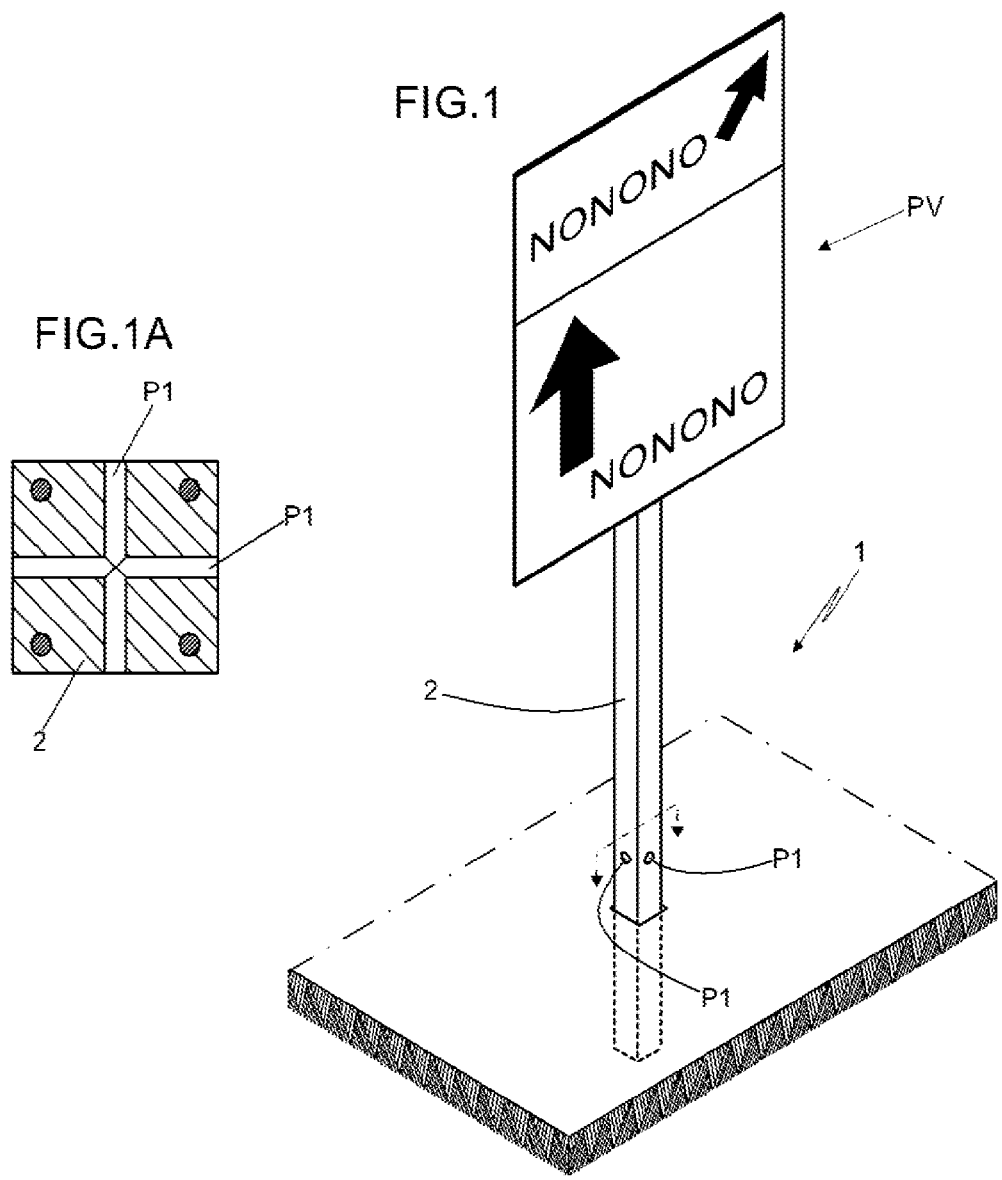

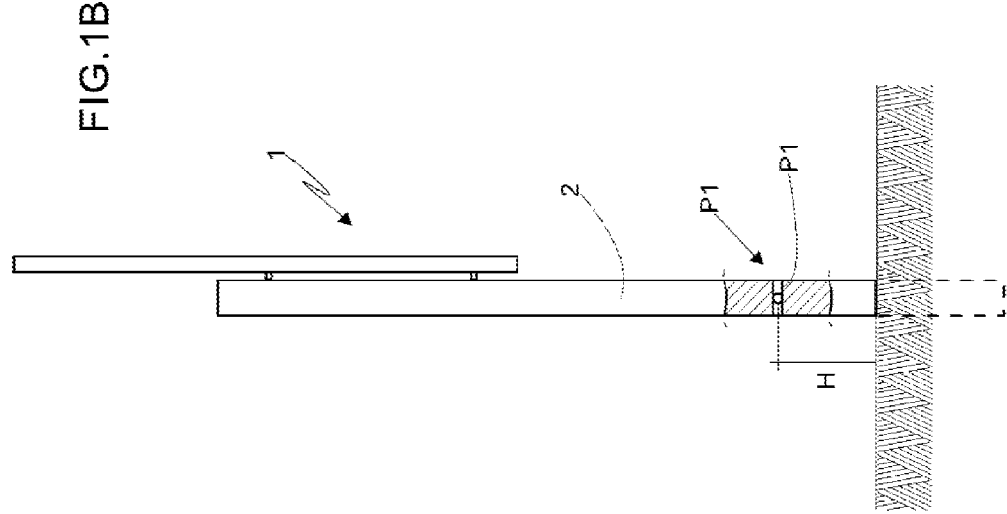
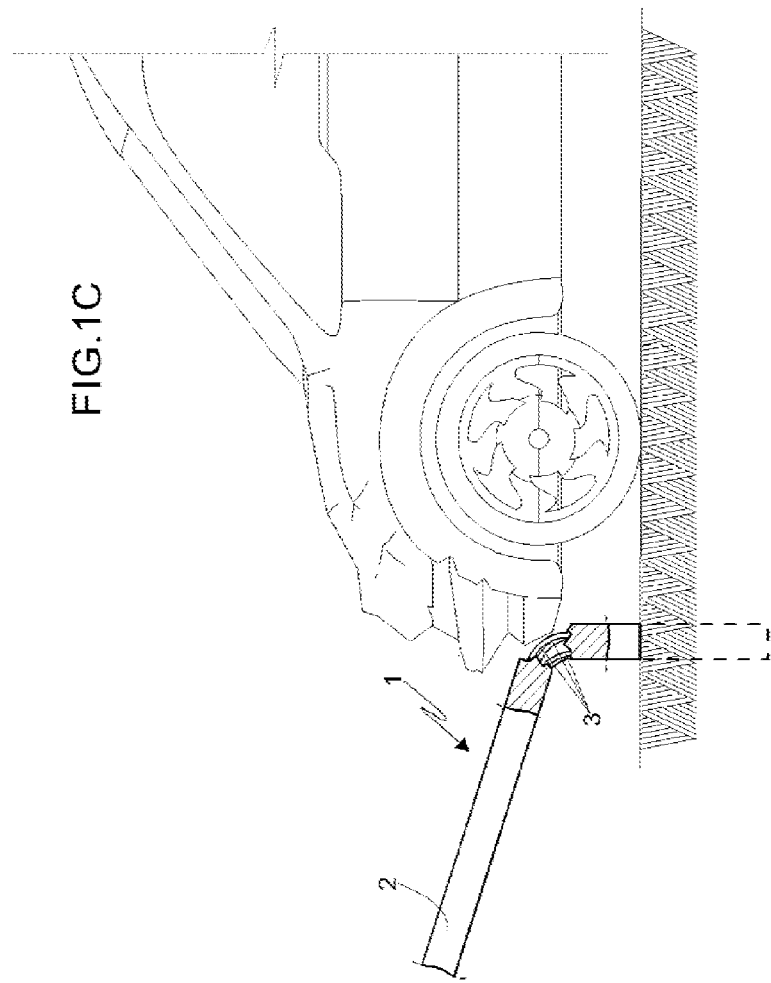

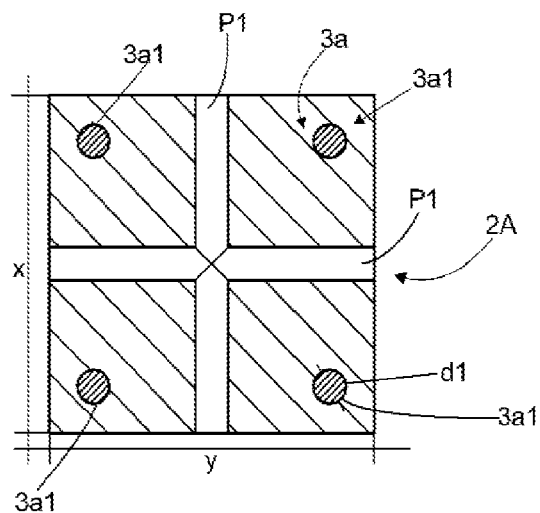
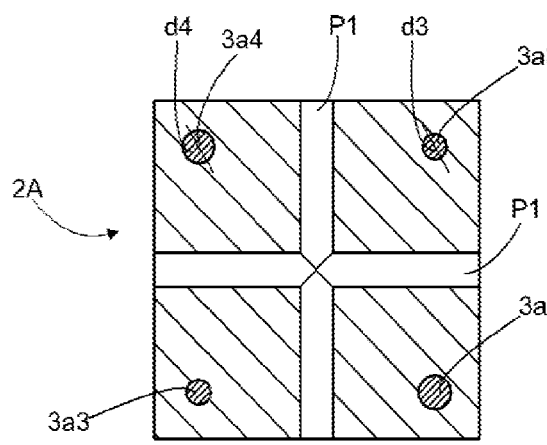
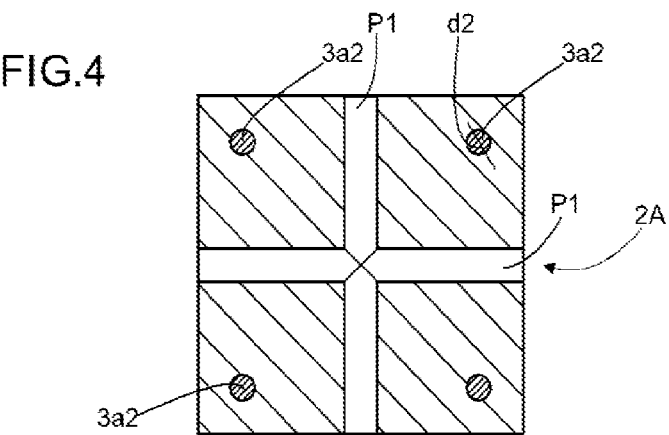

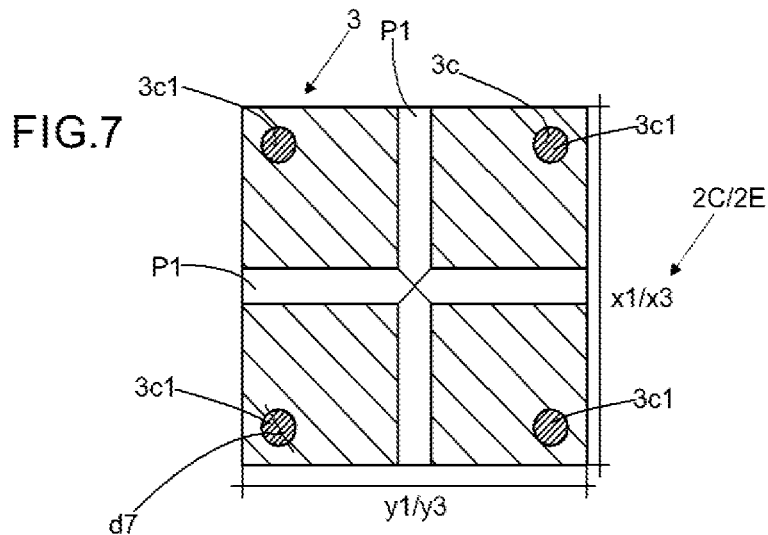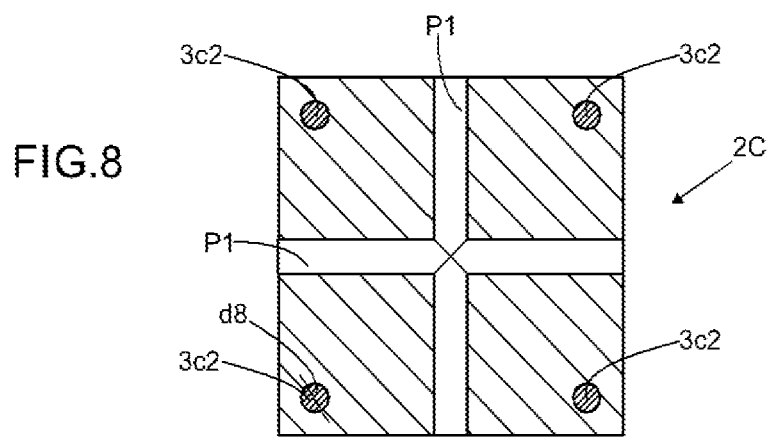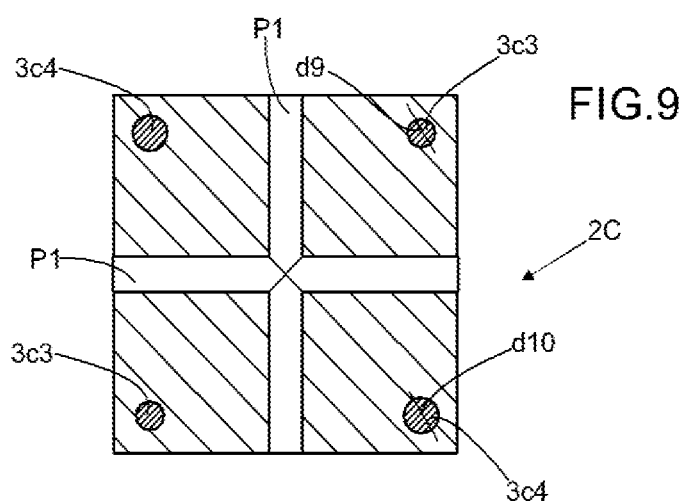

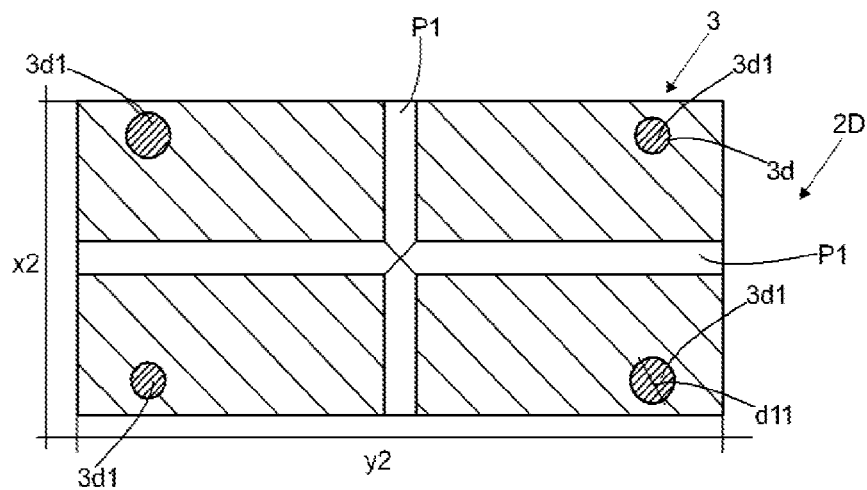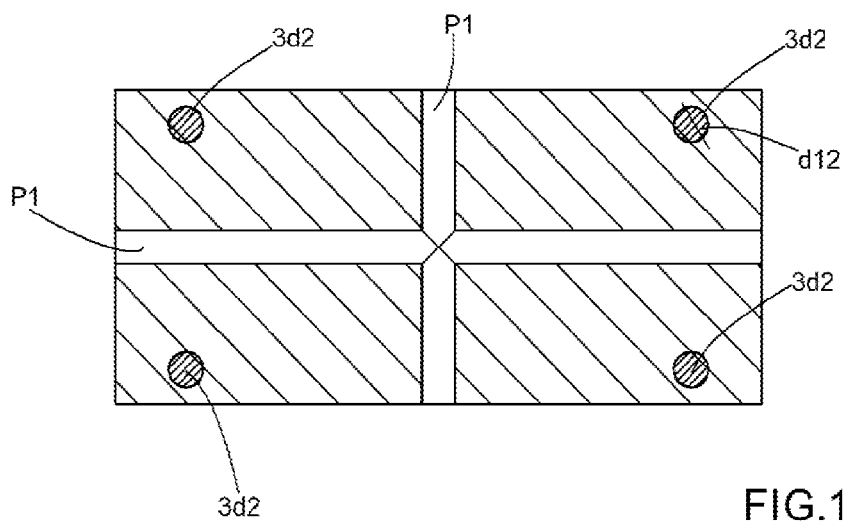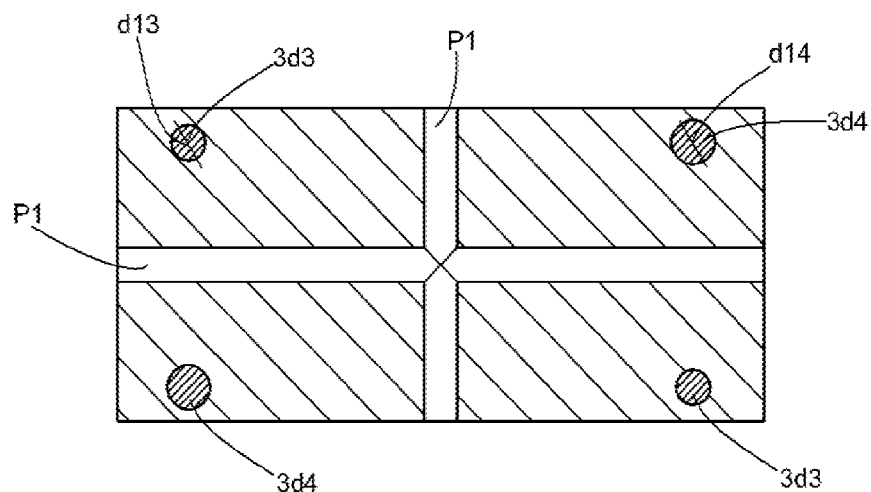

COLLAPSIBLE SIGN POST

FIELD

The present disclosure addresses the improvements introduced in support posts used for vertical signposts where, notably, such support posts present innovated constructive characteristics obtained by the association of a new composition developed as of the reuse of manufactured products through plastic and tire ground rubber, as well as new arrangements of structure hardware incorporated in the body of the support post enabling improvement in the mechanical resistance, mainly support post breakdown, due to its construction.

BACKGROUND

It is known to use signposts for the purpose of guiding users of a route along their path of travel. Such signpost provide users with the necessary information for directions, as well as, among others, information with regard to the distances covered over their route.

Such signposts also have the purpose of guiding the users with regard to the existence of services throughout the travel path, such as gas stations, restaurants, hospitals, police stations, among others. In addition, signposts have the purpose of guiding users with regard to the occurrence of geographical reference points such as state and city borders, rest area locations, historic parks and sites and educational messages of traffic safety.

Such signposts typically encompass graphic images applied to signs of different shapes, such as rectangular, supported above the ground by a support post. The planar surface of the signs can present different colors (e.g., green, red, etc.), where legends, arrows and diagrams in a different color (e.g., white, black, etc.) could be applied. Signs are also provided for highway identification having a particular shape. Likewise supplementary signs identifying services often present a blue background.

According to the current regulation in DENATRAN (Brazil), the support posts must be sized and fixed in order to withstand the load of the signpost itself and the effects of wind action acting on the sign while ensuring its correct position. The support posts must be fixed in order to keep the signs in their correct position, preventing them from being turned or displaced. For the fixation of the sign to the support post, it must be used proper fixing elements, in order to prevent its loosening of displacement, even after impacts or collusions.

Currently, the materials primarily used for production of support posts are galvanized steel and immunized wood, especially hardwood. The fact is that the hardwood was replaced by treated eucalyptus wood because of the shortage on the environment. Thus, the eucalyptus wood, according to the provisions of Law No. 97 of Oct. 20, 1965 and decree No. 58016 of Mar. 18, 1955 (Brazil), must receive treatment with water soluble protector in autoclave under vacuum and high pressure in order to receive the black color painting, as well as presenting retention and penetration rate of 6.5 kg of the protecting material per $m^3$ of wood according to NBR 6232 (Brazil).

However, despite of eucalyptus wood having its origin from replanting, it presents a difficult process for its treatment, in addition to chemicals used, such as arsenic, Copper Chrome Arsenic or Copper Chrome Boric Acid, which can bring health concerns for postconsumer used of this wood.

Further drawback lies in the fact of support post made as of wood treated after its useful life for incineration to the formation of coal or other purposes, but without due care in relation to the chemicals that are present in a significant amount as 6.5 $kg/m^3$. The allocation of these supports for Class I Landfill would be suggested, which is a very difficult procedure to be inspected.

On the other hand, the support posts made of steel present susceptibility to corrosion developed by the chemical or electrochemical action, which is commonly used as "rust", affecting not only the aesthetic appearance of the material, as well as the mechanical resistance and useful life.

In order to aggregate suitable resistance characteristics there are specific treatments, such as galvanizing obtained by means of application of chemicals in the support post body, such as the galvanizing process by immersion where the zincs with 98.0% of purity, contain more than 1.0% of lead and small amounts of other metals such as cadmium, iron, tin and copper, as well as the aluminum sometimes is added in small amounts, around 0.005% to increase the shine of the part and let its coating smoother.

It occurs that, during the process of galvanization process by hot immersion, two residues appear and can contaminate the bath, that is, dreg, a slurry consisting of Fe—Zn—5.0%+ 95%—, heavier than the molten zinc, which is concentrated in the bottom of the tank and grey or zinc oxide slag that is formed in the bath surface, referred to as "earth".

It is crucial that the parts are passivated after the galvanization, aiming to preserve them against wet storage stain. Some materials may present growth of the intermediate layers, due to the chemical composition and, therefore, dark Grey staining process. In this case, the speedy of the cooling of the material must be accelerated in a passivating bath.

Thus, it is verified that the natural resources, such as iron ore are used in the production of support posts of galvanized steel, as well as other natural sources for the obtainment of energy to cast the iron ore, in addition to charcoal, mineral coal and electrical energy, cause harm to the environment.

Another considerable drawback of current support post due to the necessary resistance to weather consists in the fact that they are deemed true fixed barriers against impacts by collision of vehicles, often causing death, which has being a cause for technological studies, aiming to find troubleshooting for this drawback. Accordingly, support posts must be structured to not be a factor causing injury or death in public roads, according to NBR15486 (Brazil). Thus, it required that the support post have a collapsible property such that, during the collision by a vehicle with the support post, the support post bends away from the colliding vehicle without breaking free and not providing abrupt deceleration of the vehicle and its passengers.

In a research conducted in specialized database, it was found documents related to supports/rebar/crosspiece obtained as of recycling material.

The document No. PI 0505428-1 is related to the polymer crosspiece, with natural fibers and structural hardware resulting from extruded or injected origin, thermoformed compound of virgin or recycled plastic mixed with natural fibers in a ratio of 1 to 70% of the composition and structured with metallic rods, giving full play to replace hardwood treated or used as "crosspiece". As the structural reinforcement, it is presented four rebar in the diameter of six to 12 mm, depending on the diameter, of the structure required from the crosspiece according to structure requirement.

The document No. PI 0704541-7 is related to the process to reuse and transform packages and toxic and contaminated materials in new products, and products obtained as of the manufacture of crosspiece, among others.

The document No. C1 0900485-8 consists of the process for obtaining railway sleepers but with the replacement of the core wood for a core made of the mixture of recycled polymer and chopped glass fiber, to be positioned in the region of fixation of tirefonds and support plates, jointly to longitudinal stiffeners rebar.

The document No. U.S. Pat. No. 4,150,790 is referred to the enhanced railway sleeper made by forming and bonding lignocellulose material in a monolithic triturated beam around a plurality of reinforcing bars, each one of which has a plurality of spaced protrusions fixing attached throughout its length, in specific positions with regard to midpoint of the loop and the rails mounted.

The document No. U.S. Pat. No. 5,658,519 refers to the elongate element, made of the supply of a plastic core substantially solid within a extrusion die, continuously, and a molten plastic within a framework causing surrounds of the molten plastic and binding for the plastic core and reinforcing bars to feed into the framework, in positions that surround the plastic core.

Upon performing an analysis of the documents, it is verified that the patents of No. PI 0505428-1, PI 0704541-7, C1 0900485-8, U.S. Pat. No. 4,150,790 and U.S. Pat. No. 5,658,519 use recycling materials, but differently from the material used by the applicant for the obtainment of supports for vertical signposts.

SUMMARY

Aiming to present improvements in the consumer market, the applicant developed improvements introduced in support for the vertical signposts.

Such support is developed by the association of new composition obtained through the use of high density polyethylene—HDPE. The HDPE can be purchased new for the support. However, HDPE can also be obtained, but not limited to, through the recycling of detergent bottles, disinfectant, motor oil, softeners, disinfectants, bleach, pesticides, and ground rubber obtained by tire recycling or the like. The HDPE provides structure for the support as well as an aesthetically pleasing finish for the support.

In the composition of the support cross-linked polyethylene, commonly abbreviated PEX or XLPE is added. The XLPE component is known in the market as Polycure. Though XPLE can be purchased new for the support, one source of XPLE arises from the recycling of electrical cables. The use of XPLE, which is a thermoset resin, promotes fire resistance and ultraviolet resistance. The inclusion of XPLE provides UV protection for the support extending its useful life and also provides a high level of fire resistance for the support.

In one arrangement, ground rubber, which may be sourced from used tires, is included in the composition. The ground rubber provides viscosity that enables the support to be extruded. Also the ground rubber provides ductility to the support.

The support resists wind strengths/velocities related to the worst scenario of world historical highs. While withstanding the worst wind situations, the support also presents, as a fundamental feature, breakdown capability. That is, the support is constructed with ability to bend when a vehicle collides with the support. That is, the support folds in response to collision/shock, preferably but not limited to, at a height of about 10-20 cm above the ground in which the lower portion of the support is disposed, so that the vehicle does not suffer serious damage or abrupt deceleration. Further, the support maintains integrity such that the support does not separate where the upper portion is projected back to the highway potentially endangering other users of the route. The material breakdown also prevents the signpost to be protruded above the vehicle, as the post bends away from a vehicle colliding with the support.

The breakdown occurs in view of the material ductile property. In addition to the ductility, fragility points are included in the bottom part of the support. Preferably, the fragility points are located approximately 20 cm above the ground after installation. This fragility point consist of one or more holes, typically but not limited to, 10 to 15 mm of diameter that runs through the support in at least one direction and preferably both directions, crosswise.

The section of the support made as of the recycling polymer can present different cross sections with variations of length. For instance:
i) quadrangular section with diameter of, for instance, 8×8 cm and up to 5.5 m of length; ii) circular cross section with a diameter of, for instance, 6 cm and up to 4 m of length; iii) quadrangular section with a diameter of 10×10 cm and up to 6 cm of length; iv) rectangular section with dimension of 7×15 cm and up to 6 m of length; v) quadrangular section with dimension of, for instance, 5.5×5.5 cm and up to 3 m of length.

To improve the structural properties of the support made of polymer, the support may further include internal reinforcement fittings, which in one arrangement are in the form of steel bars (e.g., rebar). Such rebar is installed within the polymer support and, with the combination of distinct polymer sections and with the diameter variation of rebars, enhances the mechanical properties of the support.

Such polymer sections may also receive tubular sections, such as conduits, allowing the passage of cables and electric wires in order to facilitate the installation of lights, reflectors, lighted signs and related about the polymeric support.

One of the main advantages of this support of signposts lies in the fact that the new composition promoting an alternative to reduce the use of natural and energy resources, as well as it allows the reuse of products made from plastic in order to reduce pollution of the environment.

Another advantage of the reuse of plastic for obtaining signpost support of vertical supports lies in the fact of replacing brackets made from wood, which is scarce in nature or have a high cost of production.

Another advantage lies in the fact the forecast of 'Polycure'—XLPE—in support of the composition to promote a high concentration of 'UV resistance'—ultraviolet and flame-retardant promoting greater resistance to media.

Another major advantage lies in the fact that the polymer composition associated with the distribution of the steel bars and points of weakness in the bottom of the support, allow the support to acquire desired breakdown characteristics. That is, the support has the necessary resistance dictated by technical standards, while reducing the potential for secondary accidents, since the support and the signpost are folded during collision rather than separating while not offering shock resistance sufficient to be characterized as a fixed barrier, which provides abrupt deceleration of the vehicle and its occupants.

DESCRIPTION OF THE FIGURES

To complement the present description in order to obtain a better understanding of the characteristics of the present invention and according to a preferred practical embodiment thereof, accompanying description, attached hereto, a set of drawings where, exemplified way, although not limiting, it represented its operation:

The FIG. 1 represents a view in perspective and vertical support signpost with the indication sectional structural support body;

The FIG. 1A illustrates a section on the support, as shown in FIG. 1;

The FIG. 1B illustrates the support in side view, in partial section applied in the region of the weak points;

The FIG. 1C represents, as an example, breakdown movement of the support in case of vehicle collision or the like.

Figure 5:
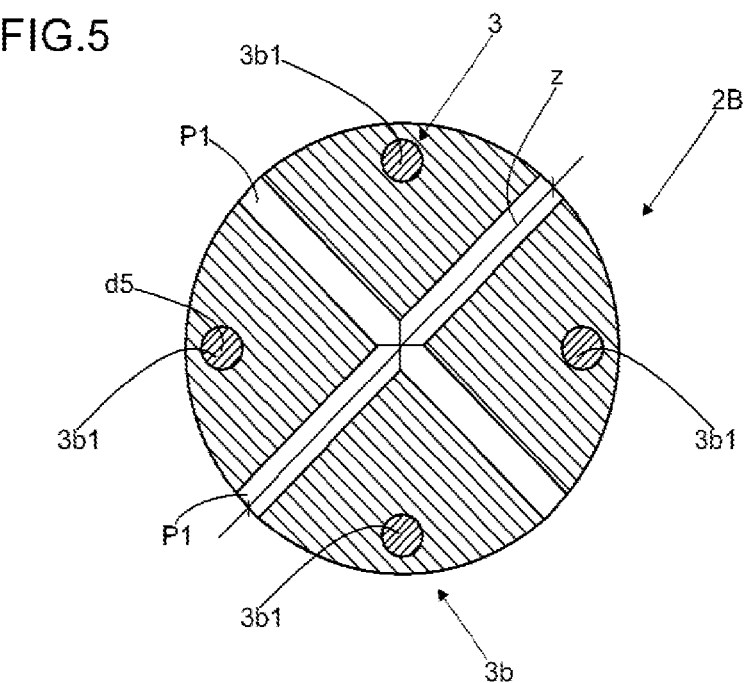
Figure 6:
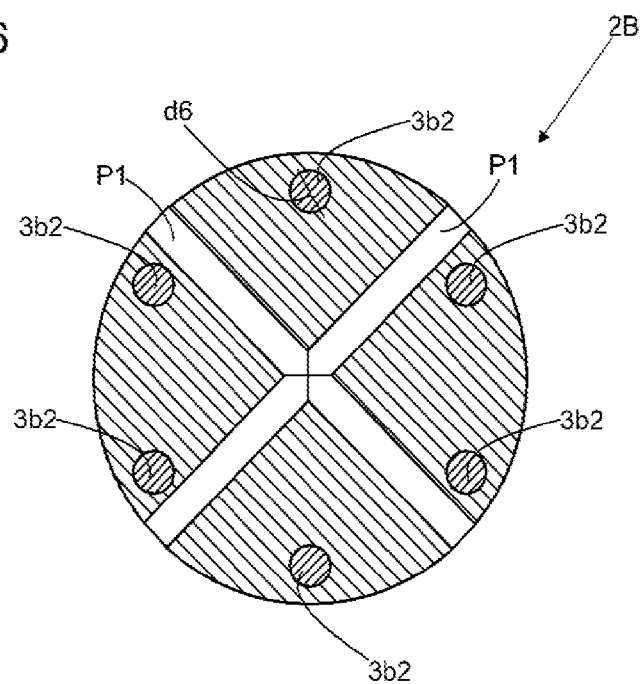
Figure 13:
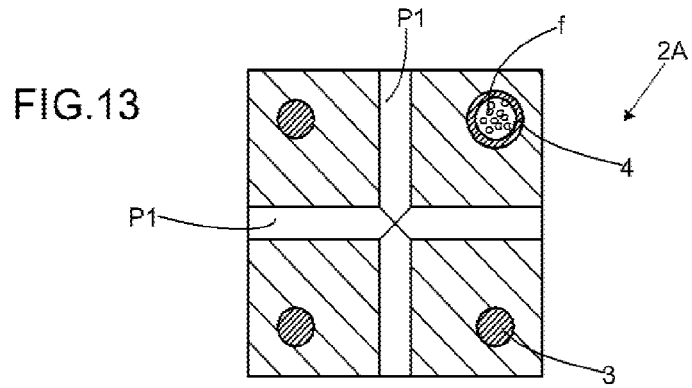
Figure 14:
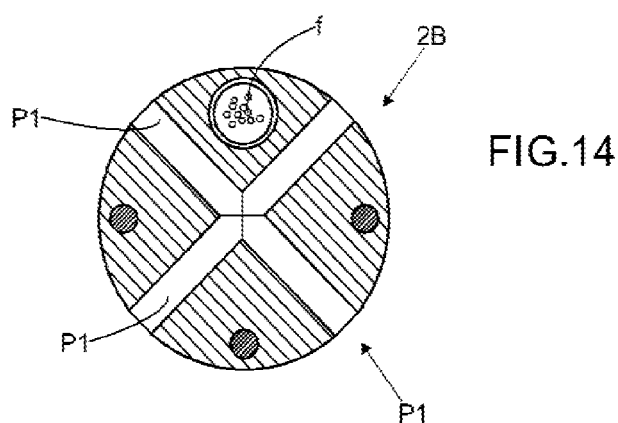
Figure 15:
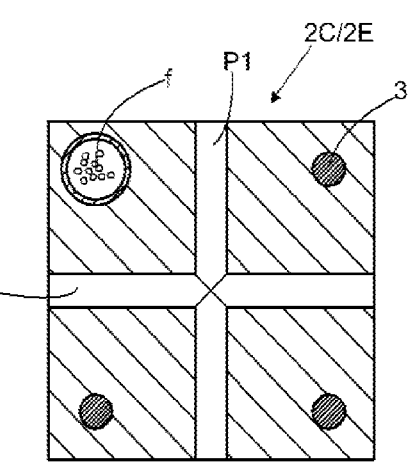
Figure 16:
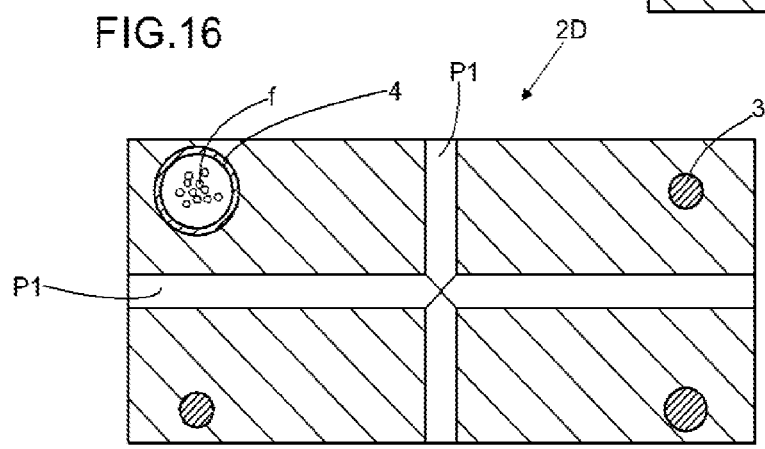

The FIGS. 2, 3 and 4 show cross-sectional views of quadrangular sections 8×8 cm illustrating the corresponding rebars arrangement;

The FIGS. 5 and 6 show views in cross-sections corresponding circular sections illustrating the rebars arrangement;

The FIGS. 7, 8 and 9 illustrate cross sectional views of quadrangular sections 10×10 cm illustrating the corresponding rebars arrangement;

The FIGS. 10, 11 and 12 represent views of cross sections of rectangular sections 7×15 cm illustrating the corresponding rebars arrangement;

The FIGS. 13, 14, 15 and 16 show cross sectional views of quadrangular sections, circular and rectangular illustrating the arrangement of rebars and associated tube sections.

DETAILED DESCRIPTION

With reference to the illustrated drawings, the present disclosure refers to "IMPROVEMENTS INTRODUCED IN SUPPORT FOR VERTICAL SIGNPOST", more precisely it is about a support (1) for vertical sign (VS), type used for setting directions as well as information about the distances, paths, petrol stations, restaurants, hospitals, police stations, and places of interest as well as guide vehicle drivers and pedestrians about the routes, destinations, access, distances, ancillary services and tourist attractions, and can also have the function of user education.

According to the invention, the support (1) is obtained from the composition of association (F) formed recycled high density polyethylene—HDPE—, tire ground rubber obtained by recycling and component 'XLPE'/Polycure from the recycling of electrical cables. These elements that can be aggregated in different proportions so long as they are in at least one range that can be defined as follows:

55 to 98% 70% of HDPE—high-density polyethylene recycled;
28 to 35% of XLPE/Polycure recycled;
5 to 15% of tire ground rubber;
1.0 to 3.0% of ultraviolet resistance; and
1.0 to 3.0% of anti-flame.

The ultraviolet resistance and anti-flame materials may be incorporated within the XLPE. That is, the 28-35% of XLPE may include these materials.

As an example of possible polymer compositions, but not limited to below represented formulations, at least three formulations are exemplified for the practical solution for implementing this support, namely:

a) Formula (A)
70% of HDPE—high-density polyethylene recycled;
30% of XLPE—Polycure recycled.

b) Formula (B)
60% HDPE—high-density polyethylene recycled;
30% of XLPE/Polycure recycled;
10% of tire ground rubber.

c) Formula (C)
95% HDPE—High Density Polyethylene recycled;
2.5% of ultraviolet resistance;
2.5% of anti-flame.

In relation to Formula (C), the ultraviolet resistance and anti-flame properties may originate from additive other than XLPE. For instance, Carbon Black may be utilized as the anti UV material, and Magnesium Hydroxide may be utilized as the flame retardant.

The section (2) of the support (1) made from the composition of recycled polymers may show different cross sections of length variations (X), namely: i) a square section (2A) with dimension (x)/(y) preferably of 8×8 cm and up to 5.5 m in length; ii) a circular section (2B) with a diameter (Z), preferably of 6 cm and up to 4 m long; iii) a square section (2C) with dimensions (x1)/(y1) of 10×10 cm and up to 6 m in length; iv) rectangular (2D) with dimension (x2)/(y2) of 7×15 cm up to 6 m in length; v) a square section (2E) with a dimension (x3)/(y3), preferably of 5.5 cm×5.5 cm and up to 3 m in length.

All the supports (1) are provided at least one weak point (P1) (fragility aperture) and preferably two points (P1) prevailing in the lower part of the support which is a height (H) from 10 to 20 cm from the ground after installation. This (these) point(s) of weakness (P1) consist of hole(s) from 10 to 15 mm in diameter which pierces the underside of the support part, in one direction, preferably in cross direction. It will be appreciated that other sections of the supports are substantially identical in shape to the section including the points of weakens with the exception that the points of weakness are absent.

The support (1) obtained from the innovative composition of recycled polymers incorporates various structural arrangements hardware or rebars (3), these arrangements that are specific for combination with the various sections (2A), (2B), (2C), (2D) and (2E) of the section (2) conferring resistance to variations of the support (1). This hardware (3) may be in the form of steel rebars and feature diametric variations. Though illustrated as having circular cross-sections, it will be appreciated that the hardware (3) may have other cross-sectional shapes as well. In one embodiment, the hardware extends continuously within the support (1) between a bottom end of the support and a top end of the support.

In a preferred constructive version, the sections (2A) with quadrangular dimensions (x)/(y) can receive the following arrangements of rebars (3a):

a) Four rebars (3a1) with a diameter (d1), preferably of 8 mm and two weak points (P1) arranged in a crossway (see FIG. 2). That association and arrangement consists resistance as shown below:

| 1. Binding Test: | |
| --- | --- |
| Width (mm) | 81.3 |
| Thickness (mm) | 80.2 |
| Load flow (N) | 20,600 | b) Four rebars (3a2) having a diameter (d2), preferably 6 mm and two weak points (P1) arranged in a cross shape (see FIG. 4). That association and arrangement make up the strength as shown below:

| 1. Binding Test: | |
| --- | --- |
| Width (mm) | 82.8 |
| Thickness (mm) | 83.0 |
| Load flow (N) | 15,600 | c) A pair of rebars (3a3) with a diameter (d3), preferably of 6 mm and a pair of rebars (3a4) with a diameter (d4), preferably of 8 mm and two weak points (P1) arranged in a crossway (see FIG. 3). That association and arrangement makes up the strength as shown below:

| 1. Binding Test: | |
| --- | --- |
| Width (mm) | 80.2 |
| Thickness (mm) | 80.4 |
| Load flow (N) | 20,200 |

In a second constructive variation, the circular sections (2B) with a diameter (z) can receive the following arrangements rebars (3b):
d) Four rebars (3b1) with a diameter (d5), preferably of 6 mm and two weak points (P1) arranged in a crossway (see FIG. 5);
e) Six rebars (3b2) with a diameter (d6), preferably of 4 mm and two weak points (P1) arranged in a crossway (see FIG. 6);
That association and arrangement of rebars (3b1) and (3b2) with section (2B) comprises the mechanical strength as shown below:

| 1. Binding Test: | |
| --- | --- |
| Diameter (mm) | 60.5 |
| Load flow (N) | 3,600 |

In a third constructive variation, the sections (2C) with dimensions (x1)/(y1) can receive the following arrangements rebars (3c):
f) Four rebars (3c1) with a diameter (d7), preferably of 10 mm and two weak points (P1) arranged in a crossway (see FIG. 7);
g) Four rebars (3c2) with a diameter (d8), preferably of 8 mm and two weak points (P1) arranged crossway (see FIG. 8);
h) A pair of rebars (3c3) with a diameter (d9) of 8 mm and preferably a pair of rebars (3c4) with a diameter (d10), preferably of 10 mm, apart from two weak points (P1) arranged crossway (see FIG. 9).
That association and arrangement of rebars (3c1), (3c2), (3c3) and (3c4) with section (2C) comprises the mechanical strength as shown below

| 1. Bending Test: | |
| --- | --- |
| Width (mm) | 102.8 |
| Thickness (mm) | 99.7 |
| Load flow (N) | 35,000 |

In the fourth constructive variation, the sections (2D) with dimension (x2)/(y2) can receive the following rebar arrangement (3d):
i) Four rebars (3d1) with a diameter (d11), preferably 10 mm and two weak points (P1) arranged in cross form (see FIG. 10);
j) Four rebars (3d2) with a diameter (d12), preferably of 8 mm and two weak points (P1) arranged crossway (see FIG. 11);
l) A pair of rebars (3d3) with a diameter (d13), preferably of 8 mm and A pair of rebars (3d4) with a diameter (d14), preferably of 10 mm, apart from two weak points (P1) arranged crossway (see FIG. 12).

The association and arrangement of rebars (3d1), (3d2), (3d3) and (3d4) with section (2D) comprises the mechanical strength as shown below:

| 1. Bending Test: | | |
| --- | --- | --- |
| Width (mm) | 72.7 | 151.8 |
| Thickness (mm) | 153.4 | 72.8 |
| Rated load (N) | 11,500 | 27,500 |
| Load flow (N) | 20,000 | 67,469 |

In the fifth constructive variant, the sections (2E) with dimensions (x3)/(y3) can receive the following arrangements rebars (3c):
m) Four rebars (3c1) with a diameter (d7), preferably of 6 mm and two weak points (P1) arranged in a crossway (see FIG. 7);
That association and arrangement of rebars (3c1), section (2E) comprises the mechanical strength as shown below:

| 1. Bending Test: | |
| --- | --- |
| Width (mm) | 55.0 |
| Thickness (mm) | 55.0 |
| Load flow (N) | 4,000 |

In the sixth constructive variation, the sections (2A), (2B), (2C), (2D) and (2E) can receive rebars (3) and tube sections (4) as conduits for the passage of electrical cables and wires (f) in order to facilitate the installation of lights, reflectors, luminous plate and the like on the polymeric support plates (see FIGS. 13 to 16). In this fifth variation are applied to the two weak points (P1) arranged crossway.

The description of the polymer composition associated with the distribution of the steel bars, tube sections and points of weakness in the bottom of the support, allows the support to acquire currently desired breakdown characteristics, since the support has the necessary wind resistance dictated by technical standards, while cooperating with the reduction of accidents, since the support and the signpost are folded away from the collision and not offering resistance to shock intensity sufficient to be characterized as a fixed barrier, which can provide abrupt deceleration of the vehicle and its occupants causing risk to physical integrity and health of the same, as usually happens.

The support is, in one embodiment, produced in an extrusion process. That is, the formula utilized, along with any rebars and/or conduits are forced through a die. Such manufacturing is known to those skilled in the art and not further discussed.

Modifications may be introduced with regard to certain construction details and form, without this implying depart from the fundamental principles that are clearly substantiated in the set of claims, thus understood that the terminology did not have the limitation of purpose.

The invention claimed is:
1. A support post for supporting a sign comprising:
an elongated body formed of polymer having a composition of:

between about 55% and about 98% HDPE—high density polyethylene;

between about 28% to 35% of XLPE—Polycure; and between about 5% to 15% tire ground rubber;

at least one metal support rod disposed within said elongated body and extending between a lower end and an upper end of said elongated body; and at least a first aperture extending through a sidewall of said elongated body at a location closer to said lower end than said upper end of said elongated body.

2. The support post of claim 1, wherein said elongated body further comprises:

1.0 to 3.0% of ultra-violet resistance material; and 1.0 to 3.0% of flame-retardant material.

3. The support post of claim 2, wherein said ultraviolet resistance material and said flame-retardant material are inherent in said XLPE.

4. The support post of claim 1, further comprising:

at least a second aperture extending through said sidewall of said elongated body at said location closer to said lower end than said upper end of said elongated body.

5. The support post of claim 4, wherein said first and second apertures are crosswise and intersect within said support post.

6. The support post of claim 1, wherein said aperture is disposed at a height (H) from 10 to 20 cm above the ground after installation.

7. The support post of claim 1, wherein said aperture comprises a diameter of between about 10 mm and 15 mm.

8. The support post of claim 1, wherein said HDPE is a recycled material and said XLPE is a recycled material.

9. The support post of claim 1, wherein said support post has a quadrangular cross-section with a dimension (x) of between about 5.5 cm and about 10 cm and with a dimension (y) of between about 5.5 cm and about 10 cm and a length between said lower end and said upper end between about 3 m and about 6 m.

10. The support post of claim 1, wherein said support post has a circular cross-section.

11. The support post of claim 1, wherein said polymer has a composition of:

about 60% HDPE;

30% XLPE; and

10% tire ground rubber.

12. The support post of claim 1, wherein said metal support rod has a diameter between about 4 mm and about 10 mm.

13. The support post of claim 10, wherein at least two metal support rods are disposed within said elongated body, wherein diameters of said two metal support rods are different.

14. The support post of claim 1, wherein between 2 and 4 metal support rods are disposed within said elongated body.

15. The support post of claim 1, further comprising:

a conduit for the passage of electric cables and wires disposed within said elongated body and extending over at least a portion of said elongated body between said lower end and said upper end.

16. The support post of claim 1, wherein said aperture extend through said elongated body at an angle to a long axis of said elongated body.

* * * * *